US012223877B2

(12) United States Patent
Li et al.

(10) Patent No.: US 12,223,877 B2
(45) Date of Patent: Feb. 11, 2025

(54) DISPLAY PANEL AND DISPLAY APPARATUS

(71) Applicant: SEEYA OPTRONICS CO., LTD., Shanghai (CN)

(72) Inventors: Jialing Li, Shanghai (CN); Yongcai Shen, Shanghai (CN); Liyuan Luo, Shanghai (CN); Qi Li, Shanghai (CN)

(73) Assignee: SEEYA OPTRONICS CO., LTD., Shanghai (CN)

( * ) Notice: Subject to any disclaimer, the term of this patent is extended or adjusted under 35 U.S.C. 154(b) by 0 days.

(21) Appl. No.: 18/213,066

(22) Filed: Jun. 22, 2023

(65) Prior Publication Data

US 2024/0221582 A1 Jul. 4, 2024

(30) Foreign Application Priority Data

Dec. 30, 2022 (CN) ......................... 202211739479.1

(51) Int. Cl.

| | |
|---|---|
| ***G09G 3/20*** | (2006.01) |
| ***G09G 3/32*** | (2016.01) |
| ***G09G 3/3233*** | (2016.01) |
| ***G09G 3/3258*** | (2016.01) |
| ***H05B 45/60*** | (2022.01) |

(52) U.S. Cl.

CPC ......... *G09G 3/2074* (2013.01); *G09G 3/3233* (2013.01); *G09G 3/32* (2013.01); *G09G 3/3258* (2013.01); *G09G 2300/0443* (2013.01); *G09G 2300/0452* (2013.01); *G09G 2300/0465* (2013.01); *G09G 2300/0804* (2013.01); *G09G 2300/0842* (2013.01); *G09G 2300/0861* (2013.01); *G09G 2310/08* (2013.01); *G09G 2320/0666* (2013.01); *H05B 45/60* (2020.01)

(58) Field of Classification Search

CPC ............... G09G 3/2074; G09G 3/3233; G09G 2300/0452; G09G 2300/0465; G09G 2300/0842; G09G 2300/0861; G09G 2310/08; G09G 2320/0666; G09G 2360/16; G09G 3/32; G09G 3/3258; G09G 2300/0443; G09G 2300/0804; H05B 45/60

See application file for complete search history.

(56) References Cited

U.S. PATENT DOCUMENTS

2007/0216610 A1* 9/2007 Smith .................. H10K 59/353 345/76
2022/0277689 A1* 9/2022 Zhao .................. H01L 27/0296
2022/0301489 A1* 9/2022 Wang ....................... G09G 3/32

* cited by examiner

*Primary Examiner* — Douglas M Wilson
(74) *Attorney, Agent, or Firm* — Michael Best & Friedrich LLP

(57) ABSTRACT

Provided are a display panel and a display apparatus. The display panel includes M pixel driving circuits and N sub-pixel units, where M<N, and M and N are each a positive integer. The M pixel driving circuits are configured to drive the N sub-pixel units to emit light. According to the technical solutions, the number of pixel driving circuits is reduced, pixels per inch of the display panel are beneficial to improve, and the display resolution is improved. Moreover, the number of pixel driving circuits does not need to be increased while the number of the sub-pixel units is increased, thereby reducing the cost.

11 Claims, 17 Drawing Sheets

DISPLAY PANEL AND DISPLAY APPARATUS

CROSS-REFERENCE TO RELATED APPLICATION

This application claims priority to Chinese Patent Application No. CN 202211739479.1, filed on Dec. 30, 2022, the disclosure of which is incorporated herein by reference in its entirety.

TECHNICAL FIELD

Embodiments of the present disclosure relate to the field of display technologies and, in particular, to a display panel and a display apparatus.

BACKGROUND

With the rapid development of display technology, display requirements of a display panel are getting higher and higher, especially for requirements of the resolution and pixels per inch (PPI) of the display panel.

In a display panel in the related art, each sub-pixel unit generally corresponds to one pixel driving circuit. With the continuous updating and iteration of products, when derivative products requires extra sub-pixel units, additional pixel driving circuits also need to be added. As a result, not only the cost of new products increases, but also the circuit structure needs to be readjusted, thereby affecting the performance of products.

SUMMARY

The present disclosure provides a display panel and a display apparatus to reduce the number of pixel driving circuits, improve pixels per inch of the display panel, and improve the display resolution. Moreover, the number of pixel driving circuits does not need to be increased while the number of the sub-pixel units is increased, thereby reducing the cost.

In a first aspect, an embodiment of the present disclosure provides a display panel. The display panel includes M pixel driving circuits and N sub-pixel units, where M<N, and M and N are each a positive integer.

The M pixel driving circuits are configured to drive the N sub-pixel units to emit light.

In a second aspect, an embodiment of the present disclosure also provides a display apparatus. The display apparatus includes the display panel described in the first aspect.

According to the technical solutions of the present disclosure, M pixel driving circuits are provided to drive N sub-pixel units to emit light, and M<N. Thus, part of the sub-pixel units need to be driven to emit light by the same pixel driving circuit. In this manner, the number of pixel driving circuits can be reduced to a certain extent, the pixels per inch of the display panel can be improved, the display resolution can be improved, and the structure is simple. Moreover, the number of pixel driving circuits does not need to be increased while the number of the sub-pixel units is increased, thereby reducing the cost.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate the technical solutions in embodiments of the present disclosure or the technical solutions in the related art more clearly, drawings used in the description of the embodiments or the related art are described briefly hereinafter. Apparently, the drawings described hereinafter illustrate only part of embodiments of the present disclosure. For those skilled in the art, other structures and drawings may be extended and expanded based on basic concepts of an element structure, driving method, and manufacturing method disclosed and suggested by various embodiments of the present disclosure. It is undoubtedly that these should be within the scope of claims of the present disclosure.

DETAILED DESCRIPTION

To illustrate the objects, technical solutions, and advantages of embodiments of the present disclosure more clearly, the technical solutions in embodiments of the present disclosure are described clearly and completely in conjunction with drawings in embodiments of the present disclosure. Apparently, the embodiments described are part, not all, of embodiments of the present disclosure. All other embodiments acquired by those skilled in the art based on basic concepts disclosed and suggested by embodiments of the present disclosure are within the scope of the present disclosure.

In view of the problems in the background, an embodiment of the present disclosure provides a display panel. The display panel includes M pixel driving circuits and N sub-pixel units, where M<N, and M and N are each a positive integer. The M pixel driving circuits are configured to drive the N sub-pixel units to emit light.

According to the preceding technical solutions, M pixel driving circuits are provided to drive N sub-pixel units to emit light, and M<N. Thus, part of the sub-pixel units need to be driven to emit light by the same pixel driving circuit. In this manner, the number of pixel driving circuits can be reduced to a certain extent, the pixels per inch of the display panel can be improved, the display resolution can be improved, and the structure is simple. Moreover, the number of pixel driving circuits does not need to be increased while the number of the sub-pixel units is increased, thereby reducing the cost.

The preceding is the core idea of the present application. Hereinafter, technical solutions in the embodiments of the present disclosure are described clearly and completely in conjunction with drawings in the embodiments of the present disclosure. Apparently, the embodiments described below are part, not all, of the embodiments of the present disclosure. Based on the embodiments of the present disclosure, all other embodiments obtained by those having ordinary skill in the art without creative work are within the scope of the present disclosure.

Figure 1:
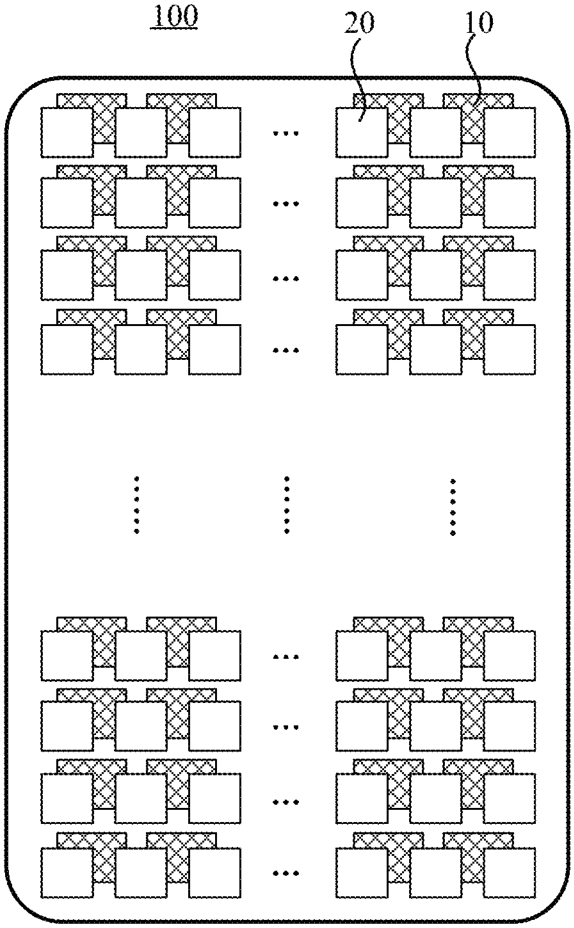
FIG. 1 is a diagram illustrating the structure of a display panel according to an embodiment of the present disclosure.

FIG. 1 is a diagram illustrating the structure of a display panel according to an embodiment of the present disclosure. As shown in FIG. 1, a display panel 100 includes M pixel driving circuits 10 and N sub-pixel units 20, where M<N, and M and N are each a positive integer. The M pixel driving circuits 10 are configured to drive the N sub-pixel units 20 to emit light.

It is to be understood that the arrangement of the M pixel driving circuits 10 in the display panel 100 may be in any form, and this is not specifically limited in this embodiment of the present disclosure. At the same time, the arrangement of the N sub-pixel units 20 may also be in any form, and this is also not specifically limited in this embodiment of the present disclosure. FIG. 1 illustrates that the M pixel driving circuits 10 and the N sub-pixel units 20 are arranged in an array, but this embodiment is not limited thereto.

A sub-pixel unit 20 includes a light-emitting element electrically connected to a pixel driving circuit 10. The light-emitting element includes, but is not limited to, an organic light-emitting diode (OLED), a mini light-emitting diode (mini-LED), or a micro light-emitting diode (micro-LED). This is not specifically limited in this embodiment of the present disclosure and may be provided according to actual requirements. The sub-pixel unit 20 may be a red sub-pixel unit, a green sub-pixel unit, a blue sub-pixel unit, a white sub-pixel unit, or another color sub-pixel unit. This is also not specifically limited in this embodiment of the present disclosure.

In an embodiment, the pixel driving circuit 10 may be a current-type pixel driving circuit or a voltage-type pixel driving circuit. It is to be understood that when the pixel driving circuit 10 is a current-type pixel driving circuit, the pixel driving circuit 10 can effectively compensate the threshold voltage drift and channel mobility of a driving transistor. When the pixel driving circuit 10 is a voltage-type pixel driving circuit, the pixel driving circuit 10 is controlled under a constant current. The sub-pixel unit can be driven to emit light according to the data voltage written to the driving transistor. The specific structure and driving manner of the pixel driving circuit 10 are not limited in this embodiment of the present disclosure and may be set according to actual requirements.

Since driving manners of pixel driving circuits 10 are different, correspondingly, the specific connection manners of the M pixel driving circuits 10 and the N sub-pixel units 20 are different. The specific connection manners may be any connection manner without affecting the display effect. For example, in the N sub-pixel units 20, sub-pixel units 20 having the same emission color, the same luminance, and the same driving signal (driving voltage or driving current) supplied by a pixel driving circuit are driven by the same pixel driving circuit 10 to emit light. In this manner, the number of pixel driving circuits 10 can be reduced, the structure is simple, the pixels per inch of the display panel can be improved, and the display resolution is improved. Moreover, the number of pixel driving circuits does not need to be increased while the number of the sub-pixel units is increased, thereby reducing the cost.

It is to be noted that M and N may be any positive integer. This is not specifically limited in this embodiment of the present disclosure and may be provided according to actual requirements.

Figure 2:
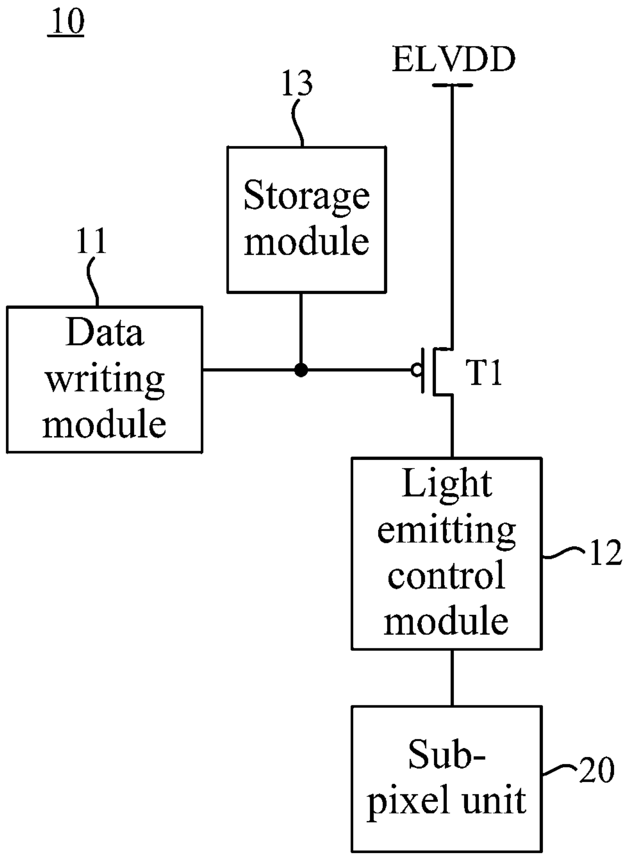
FIG. 2 is a diagram illustrating the structure of a pixel driving circuit according to an embodiment of the present disclosure.

Optionally, FIG. 2 is a diagram illustrating the structure of a pixel driving circuit according to an embodiment of the present disclosure. As shown in FIG. 2, a pixel driving circuit 10 includes a driving transistor T1, a data writing module 11, a light emitting control module 12, and a storage module 13. The data writing module 11 is electrically connected to the gate of the driving transistor T1 to write a data signal to the driving transistor T1. The light emitting control module 12 is configured to control the driving transistor T1 to supply a driving signal to a sub-pixel unit 20. The storage module 13 is configured to store the data signal written to the gate of the driving transistor T1.

In an embodiment, the driving transistor T1 may be an n-channel transistor or a p-channel transistor. This is not specifically limited in this embodiment of the present disclosure. When the driving transistor T1 is an n-channel transistor, the pixel driving circuit 10 is a voltage-type pixel driving circuit. When the driving transistor T1 is turned on, the driving transistor T1 can, under the action of a second power supply terminal ELVDD, supply a driving voltage to the sub-pixel unit 20 according to the data signal written to the gate of the driving transistor T1. For example, the driving transistor T1 may be an intrinsic n-channel field-effect transistor (native n-MOSFET), for example, a depletion-mode n-channel field-effect transistor. The intrinsic n-channel field-effect transistor is a transistor whose voltage threshold is close to zero so that difference between the voltage applied to the sub-pixel unit 20 and the gate voltage of the driving transistor T1 is smaller, and the voltage swing can be more efficiently utilized. When the driving transistor T1 is a p-channel transistor, the pixel driving circuit 10 is a current-type pixel driving circuit. The driving transistor T1 can supply a driving current to the sub-pixel unit 20 according to the data signal written to the gate of the driving transistor T1. The specific type of the driving transistor T1 is not limited in this embodiment of the present disclosure and may be set according to actual requirements. FIG. 2 merely illustrates that the driving transistor T1 is a p-channel transistor.

In addition, the storage module 13 is configured to store the data signal written to the gate of the driving transistor T1 to ensure that the pixel driving circuit 10 can drive the sub-pixel unit 20 to continuously and stably emit light. The light emitting control module 12 can control the driving transistor T1 to supply the driving signal to the sub-pixel unit 20, that is, to control the light-emitting duration of the sub-pixel unit 20. It is to be understood that only when the light emitting control module 12 is turned on, the driving transistor T1 can be caused to transmit the driving signal to the sub-pixel unit 20, thereby driving the sub-pixel unit 20 to emit light.

It is to be noted that the second terminal of the driving transistor T1 of each pixel driving circuit 10 in the display panel 100 may be electrically connected to one sub-pixel unit 20 or may be electrically connected to multiple sub-pixel units 20. This is not specifically limited in this embodiment of the present disclosure. FIG. 2 is merely a diagram illustrating the structure in which the second terminal of the driving transistor T1 of the pixel driving circuit 10 is electrically connected to one sub-pixel unit 20, but this embodiment is not limited thereto.

Figure 3:
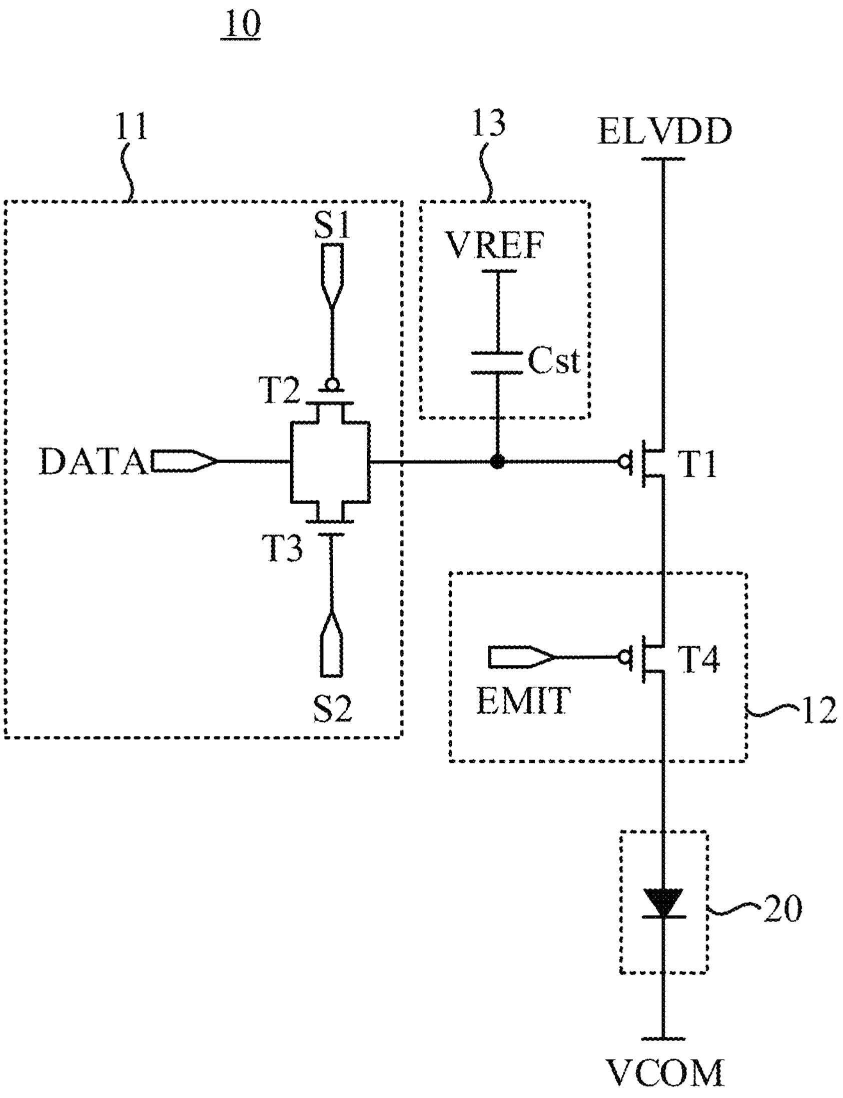
FIG. 3 is a diagram illustrating the structure of another pixel driving circuit according to an embodiment of the present disclosure.

Optionally, FIG. 3 is a diagram illustrating the structure of another pixel driving circuit according to an embodiment of the present disclosure. As shown in FIG. 3, a data writing module 11 includes a first writing transistor T2 and a second writing transistor T3. The channel type of the first writing transistor T2 and the channel type of the second writing transistor T3 are different. The first terminal of the first writing transistor T2 and the first terminal of the second writing transistor T3 are electrically connected to a data signal terminal DATA. The second terminal of the first writing transistor T2 and the second terminal of the second writing transistor T3 are electrically connected to the gate of a driving transistor T1. The gate of the first writing transistor T2 is electrically connected to a first scan signal terminal S1. The gate of the second writing transistor T3 is electrically connected to a second scan signal terminal S2. A light emitting control module 12 includes a light emitting control transistor T4. The first terminal of the light emitting control transistor T4 is electrically connected to the second terminal of the driving transistor T1. The second terminal of the light emitting control transistor T4 is electrically connected to a sub-pixel unit 20. The gate of the light emitting control transistor T4 is electrically connected to a light emitting control signal terminal EMIT. A storage module 13 includes a storage capacitor Cst. The first plate of the storage capacitor Cst is electrically connected to a first power supply terminal VREF. The second plate of the storage capacitor Cst is electrically connected to the gate of the driving transistor T1.

The first writing transistor T2 may be a p-channel transistor, and the second writing transistor T3 may be an n-channel transistor. Alternatively, the first writing transistor T2 may be an n-channel transistor, and the second writing transistor T3 may be a p-channel transistor. This is not specifically limited in this embodiment of the present disclosure and may be provided according to actual requirements. FIG. 3 is a diagram illustrating the structure in which the first writing transistor T2 is a p-channel transistor, and the second writing transistor T3 is an n-channel transistor, but this embodiment is not limited thereto. Thus, when the first scan signal s1 supplied from the first scan signal terminal S1 is a low level, the first writing transistor T2 is controlled to be turned on. When the first scan signal s1 supplied from the first scan signal terminal S1 is a high level, the first writing transistor T2 is controlled to be turned off. Similarly, when the second scan signal s2 supplied from the second scan signal terminal S2 is a high level, the second writing transistor T3 is controlled to be turned on. When the second scan signal s2 supplied from the second scan signal terminal S2 is a low level, the second writing transistor T3 is controlled to be turned off.

The light emitting control transistor T4 may be a p-channel transistor or an n-channel transistor. This is also not specifically limited in this embodiment of the present disclosure and may be set according to actual requirements. FIG. 3 illustrates that the light emitting control transistor T4 is a p-channel transistor, but this embodiment is not limited thereto. With continued reference to FIG. 3, FIG. 3 also shows that the sub-pixel unit includes an organic light-emitting diode. The anode of the organic light-emitting diode is electrically connected to the second terminal of the driving transistor T1. The cathode of the organic light-emitting diode is electrically connected to a third power supply terminal VCOM. For ease of explanation of the solution, FIG. 3 is merely a diagram illustrating the structure in which the pixel driving circuit 10 is electrically connected to one sub-pixel unit 20, but this embodiment is not limited thereto.

Figure 4:
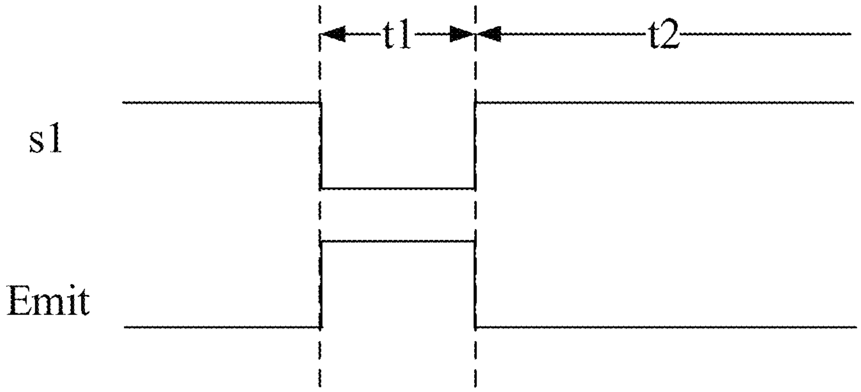
FIG. 4 is a drive timing diagram of the pixel driving circuit in FIG. 3.

In an optional embodiment, FIG. 4 is a drive timing diagram of the pixel driving circuit in FIG. 3. The driving cycle of the pixel driving circuit 10 includes a data writing stage t1 and a light-emitting stage t2. In the data writing stage t1, the first scan signal s1 of the first scan signal terminal S1 is a low level. At this time, the first writing transistor T2 is in the on state. The data signal Vdata of the data signal terminal DATA is written to the gate of the driving transistor T1 through the first writing transistor T2 and stored in the storage capacitor Cst. At the same time, the light emitting control signal Emit of the light emitting control signal terminal EMIT is a high level. The light emitting control transistor T4 is controlled to be turned off.

In the light-emitting stage t2, the first scan signal s1 is a high level to control the first writing transistor T2 to turn off. The light emitting control signal Emit is a low level to control the light emitting control transistor T4 to turn on. At this time, the second power supply terminal ELVDD may be a positive power supply signal. The cathode of the sub-pixel unit 20 is electrically connected to the third power supply terminal VCOM. A negative power supply signal is written. A path is formed from the positive power supply signal to the negative power supply signal. Thus, the driving transistor T1, under the control of the second power supply terminal ELVDD, supplies the driving signal to the sub-pixel unit 20 according to the data signal Vdata written to the gate of the driving transistor T1. Since the driving transistor T1 is a p-channel transistor, the driving signal is a driving current, thereby driving the sub-pixel unit 20 to emit light.

It is to be noted that when the first scan signal s1 of the first scan signal terminal S1 controls the first writing transistor T2 to turn on, the second scan signal s2 of the second scan signal terminal S2 can control the second writing transistor T3 to turn on or off. This is not specifically limited in this embodiment of the present disclosure.

In other embodiments, in the data writing stage t1, the second scan signal s2 of the second scan signal terminal S2 may control the second writing transistor T3 to turn on so that the data signal Vdata of the data signal terminal DATA is written to the gate of the driving transistor T1 through the second writing transistor T3. At this time, the first scan signal s1 of the first scan signal terminal S1 may control the first writing transistor T2 to turn on or off. Details of the process are not described herein.

Figure 5:
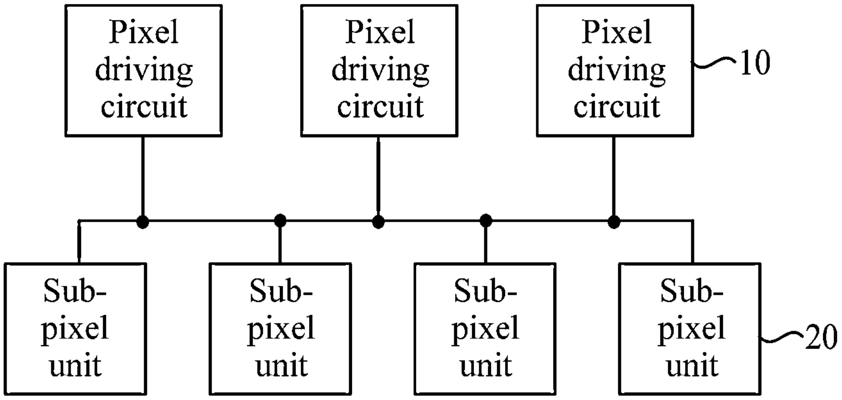
FIG. 5 is a diagram illustrating the partial structure of a display panel according to an embodiment of the present disclosure.

Optionally, FIG. 5 is a diagram illustrating the partial structure of a display panel according to an embodiment of the present disclosure. As shown in FIG. 5, emission colors of N sub-pixel units 20 are the same. The output terminal of each pixel driving circuit 10 is electrically connected to the N sub-pixel units 20.

Here, the emission colors of the N sub-pixel units 20 in a display panel 100 are the same. The emission colors may be red, green, blue, white, yellow, magenta, or the like. This is not specifically limited in this embodiment of the present disclosure and may be provided according to actual requirements.

Referring to FIG. 5, for example, M=3, and N=4. The output terminal of each of the three pixel driving circuits 10 is electrically connected to the N sub-pixel units 20. That is, the four sub-pixel units 40 are connected in parallel to the output terminals of the three pixel driving circuits 10. When the pixel driving circuits 10 are voltage-type pixel driving circuits, the four sub-pixel units 40 are driven by the three pixel driving circuits 10. Thus, the driving voltages received by the sub-pixel units 20 are the same. Further, the sub-pixel units 20 have the same luminance under the driving of the same driving voltage, thereby facilitating improvement of display uniformity. When the pixel driving circuits 10 are current-type pixel driving circuits, driving currents output from all of the pixel driving circuits 10 can be evenly distributed to all of the sub-pixel units 40. Similarly, the sub-pixel units 20 can have the same luminance under the driving of the same driving current, thereby facilitating improvement of display uniformity. Thus, in the case where the display requirements of the display panel 100 are satisfied, when the N sub-pixel units 20 have the same emission color, the output terminal of each pixel driving circuit 10 is electrically connected to the N sub-pixel units 20 to simultaneously drive all of the sub-pixel units 20. In this manner, the number of pixel driving circuits 10 can be reduced, the circuit structure can be simplified, and pixels per inch and resolution can be improved.

Figure 6:
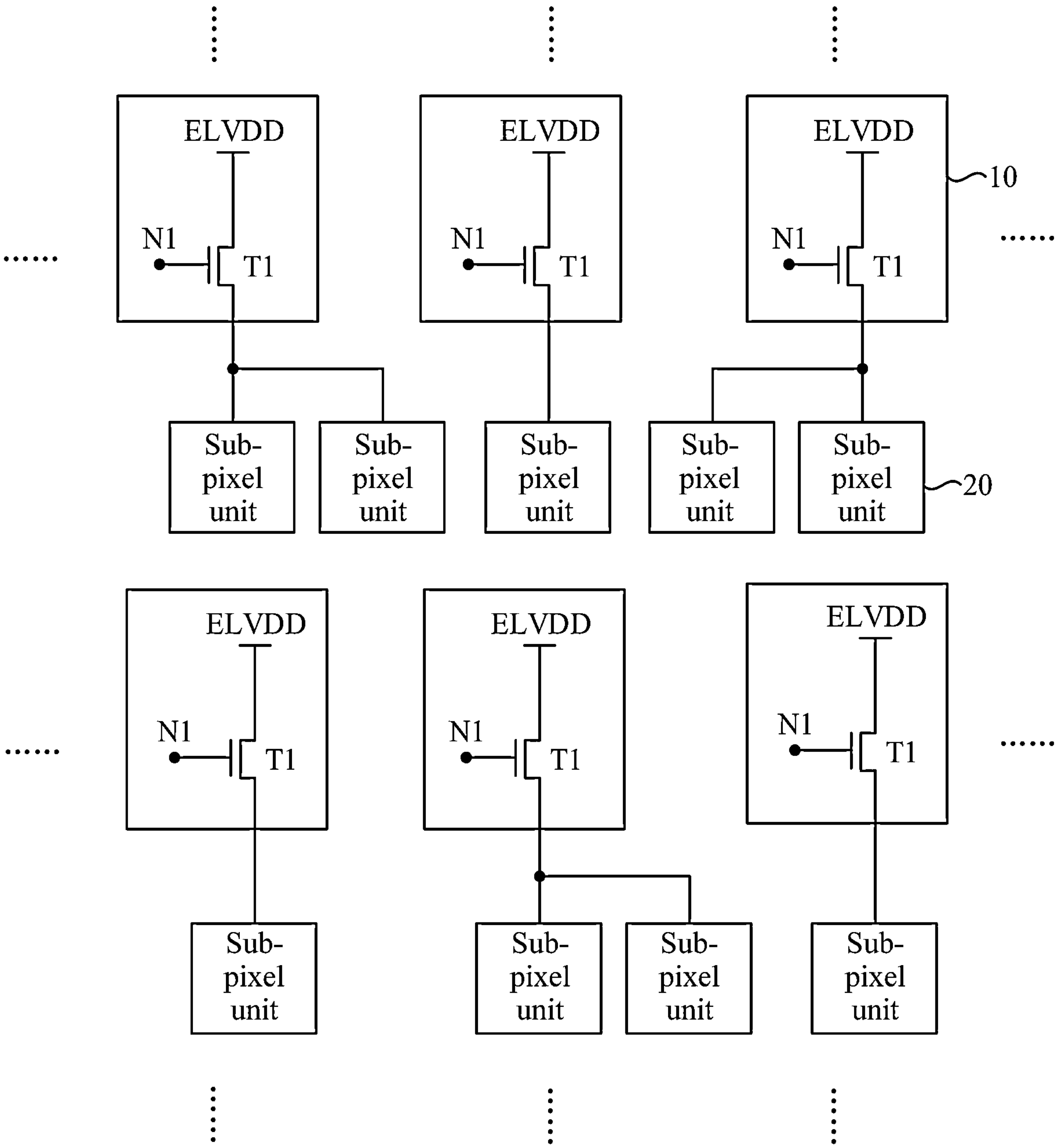
FIG. 6 is a diagram illustrating the partial structure of another display panel according to an embodiment of the present disclosure.

Optionally, FIG. 6 is a diagram illustrating the partial structure of another display panel according to an embodiment of the present disclosure. With reference to FIG. 2 and FIG. 6, emission colors of N sub-pixel units 20 are the same. A pixel driving circuit 10 includes a driving transistor T1. The driving transistor T1 includes an n-channel thin-film transistor. There is a difference in the number of sub-pixel units 20 driven by two pixel driving circuits 10.

It is to be understood that the driving transistor T1 of a pixel driving circuit 10 includes an n-channel thin-film transistor. That is, the pixel driving circuit 10 is a voltage-type pixel driving circuit and can supply a driving voltage to a sub-pixel unit 20 to drive the sub-pixel unit 20 to emit light.

Exemplarily, with reference to FIG. 6, the structure of a pixel driving circuit 10 includes, but is not limited to, the structures shown in FIG. 2 and FIG. 3. FIG. 6 merely illustrates that a driving transistor T1, under the control of a second power supply terminal ELVDD, supplies a driving voltage to a sub-pixel unit according to a data signal written by a first node N1 to drive the sub-pixel unit 20 to emit light. FIG. 6 illustrates that a display panel 100 includes two types of pixel driving circuits 10 which drive different numbers of sub-pixel units 20. The number of sub-pixel units 20 driven by one type of a pixel driving circuit 10 is two. The number of sub-pixel units 20 driven by another type of a pixel driving circuit 10 is one. However, this embodiment is not limited thereto. Since the pixel driving circuits 10 are voltage-type pixel driving circuits, on the premise that power supply signals supplied by second power supply terminals ELVDD in the pixel driving circuits 10 are the same and data signals written by driving transistors T1 are the same, the driving voltages supplied from the pixel driving circuits 10 to the sub-pixel units 20 are the same. Thus, the luminance of the sub-pixel units 20 is the same, thereby ensuring the uniformity of the display luminance. in the case where the display requirements are satisfied, the number of sub-pixel units 20 driven by each pixel driving circuit 10 may be any value. This is not specifically limited in this embodiment of the present disclosure and may be provided according to actual requirements.

Figure 7:
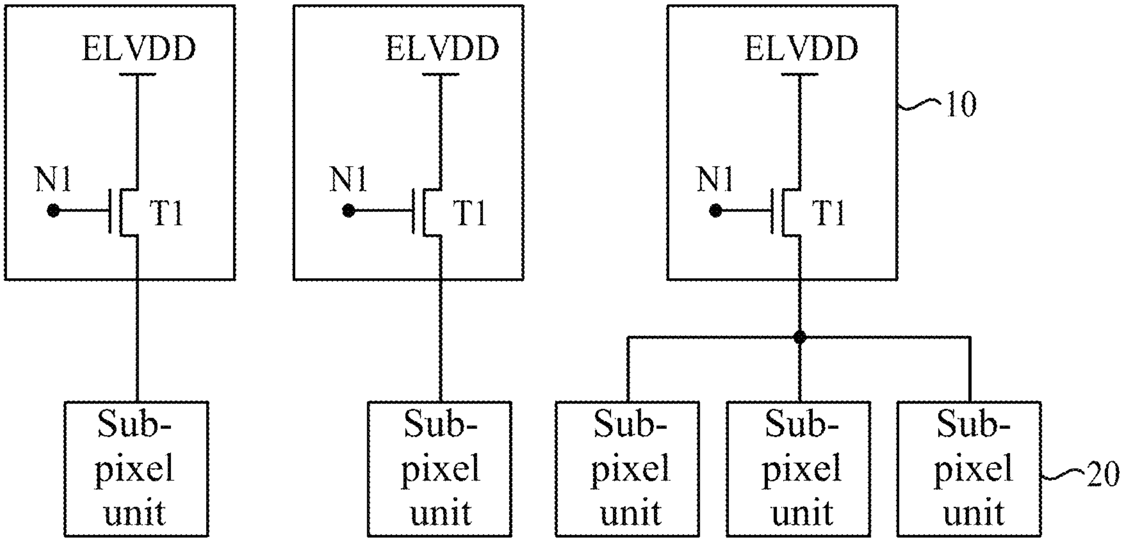
FIG. 7 is a diagram illustrating the partial structure of another display panel according to an embodiment of the present disclosure.

Optionally, FIG. 7 is a diagram illustrating the partial structure of another display panel according to an embodiment of the present disclosure. As shown in FIG. 7, among M pixel driving circuits 10, the output terminal of the driving transistor T1 of one pixel driving circuit 10 is electrically connected to N−M+1 sub-pixel units. The output terminal of the driving transistor of each of other pixel driving circuits 10 is electrically connected to one sub-pixel unit 20.

In an embodiment, among the M pixel driving circuits 10, the output terminal of the driving transistor T1 of each of M−1 pixel driving circuits 10 is electrically connected to one sub-pixel unit 20. M−1 pixel driving circuits 10 are electrically connected to M−1 sub-pixel units 20 in a one-to-one manner. Thus, each of the M−1 pixel driving circuits 10 drives one sub-pixel unit 20 to emit light. All of other sub-pixel units 20 are driven by the same pixel driving circuit 10 to emit light. The driving transistors T1 of the M pixel driving circuits 10 include n-channel thin-film transistors. That is, the M pixel driving circuits 10 are all voltage-type pixel driving circuits. Thus, N sub-pixel units 20, under the control of the same driving voltage, can still ensure that the final luminance is the same, thereby ensuring display uniformity.

Exemplarily, referring to FIG. 7, for example, M=3 and N=5. The driving transistor T1 of one pixel driving circuit 10 is electrically connected to three sub-pixel units 20 to simultaneously drive the three sub-pixel units 20 to emit light. The output terminal of the driving transistor T1 of each of other pixel driving circuits 10 is electrically connected to one sub-pixel unit 20 to drive each sub-pixel unit 20 to emit light.

Figure 8:
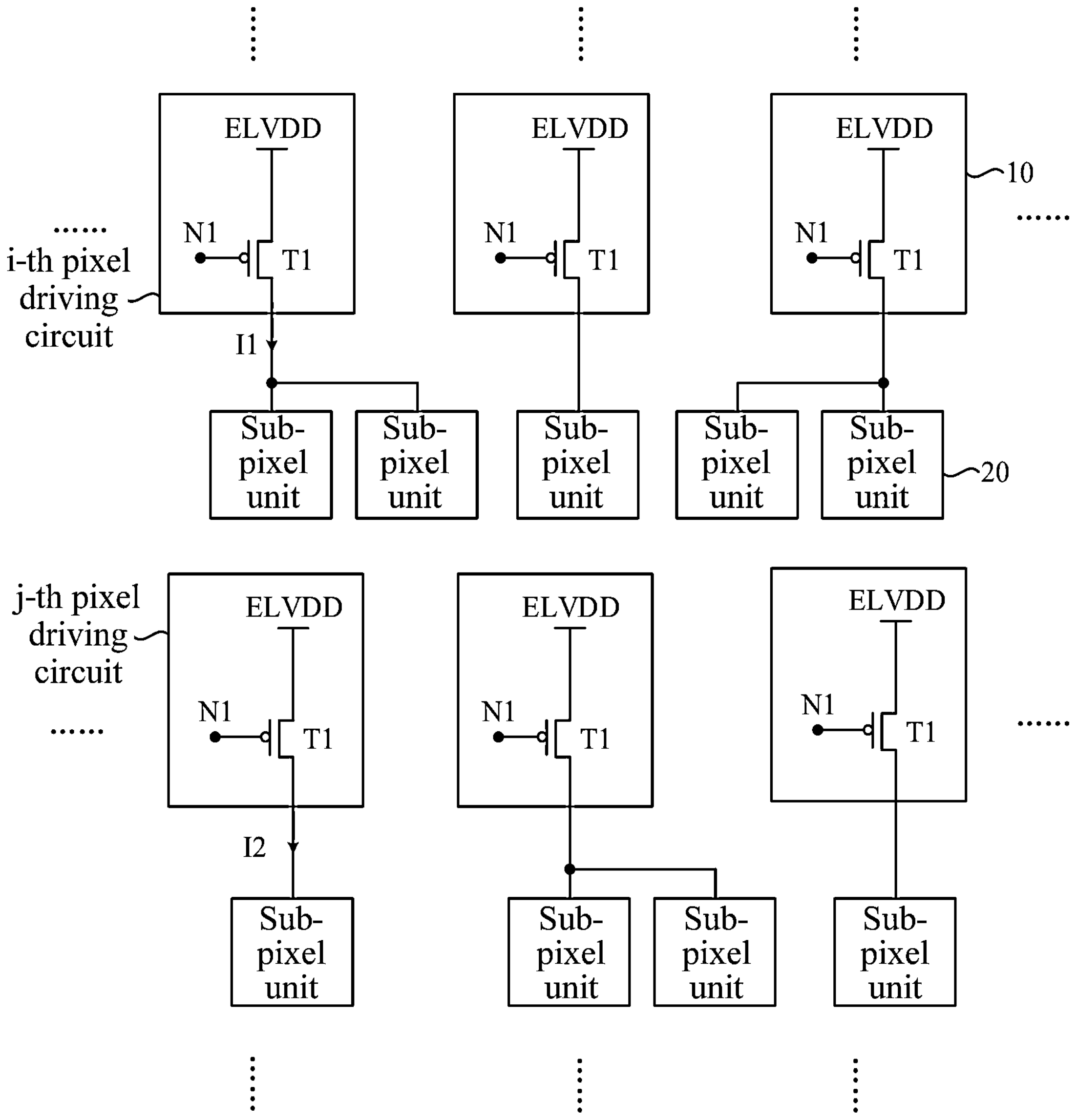
FIG. 8 is a diagram illustrating the partial structure of another display panel according to an embodiment of the present disclosure.

Optionally, FIG. 8 is a diagram illustrating the partial structure of another display panel according to an embodiment of the present disclosure. As shown in FIG. 8, emission colors of N sub-pixel units 20 are the same. A pixel driving circuit 10 includes a driving transistor T1. The driving transistor T1 includes a p-channel thin-film transistor. M pixel driving circuits 10 include an i-th pixel driving circuit and an j-th pixel driving circuit, where 1≤i≤M, 1≤j≤M, and i≠j. The difference ΔI between a driving current I1 output from the i-th pixel driving circuit and a driving current I2 output from the j-th pixel driving circuit satisfies $\Delta I/((I1+I2)/2) \leq 20\%$.

It is to be understood that the driving transistor T1 of a pixel driving circuit 10 includes a p-channel thin-film transistor. That is, the pixel driving circuit 10 is a current-type pixel driving circuit and can supply a driving current to a sub-pixel unit 20 to drive the sub-pixel unit 20 to emit light.

Exemplarily, with reference to FIG. 8, N sub-pixel units 20 may be driven to emit light by M pixel driving circuits. The number of sub-pixel units 20 driven by each pixel driving circuit 10 may be any value. FIG. 8 merely illustrates that each of part of pixel driving circuits 10 drives two sub-pixel units 20 to emit light, and each of another part of pixel driving circuits 10 drives merely one sub-pixel unit 20 to emit light. However, this embodiment is not limited thereto. In this case, the display uniformity of a display panel 100 can still be ensured as long as the difference in the driving current output from each pixel driving circuit 10 is small, that is, the difference ΔI between the driving current I1 output from the i-th pixel driving circuit and the driving current I2 output from the j-th pixel driving circuit satisfies $\Delta I/((I1+I2)/2) \leq 20\%$, it is to be understood that the ratio of the difference ΔI between the driving current I1 outputted from the i-th pixel driving circuit and the driving current I2 outputted from the j-th pixel driving circuit to the average value of the driving current I1 and the driving current I2 is less than 20%. Moreover, the number of pixel driving circuits 10 can be reduced, the circuit structure can be simplified, the cost can be reduced, and the pixels per inch and the resolution can be improved.

Figure 9:
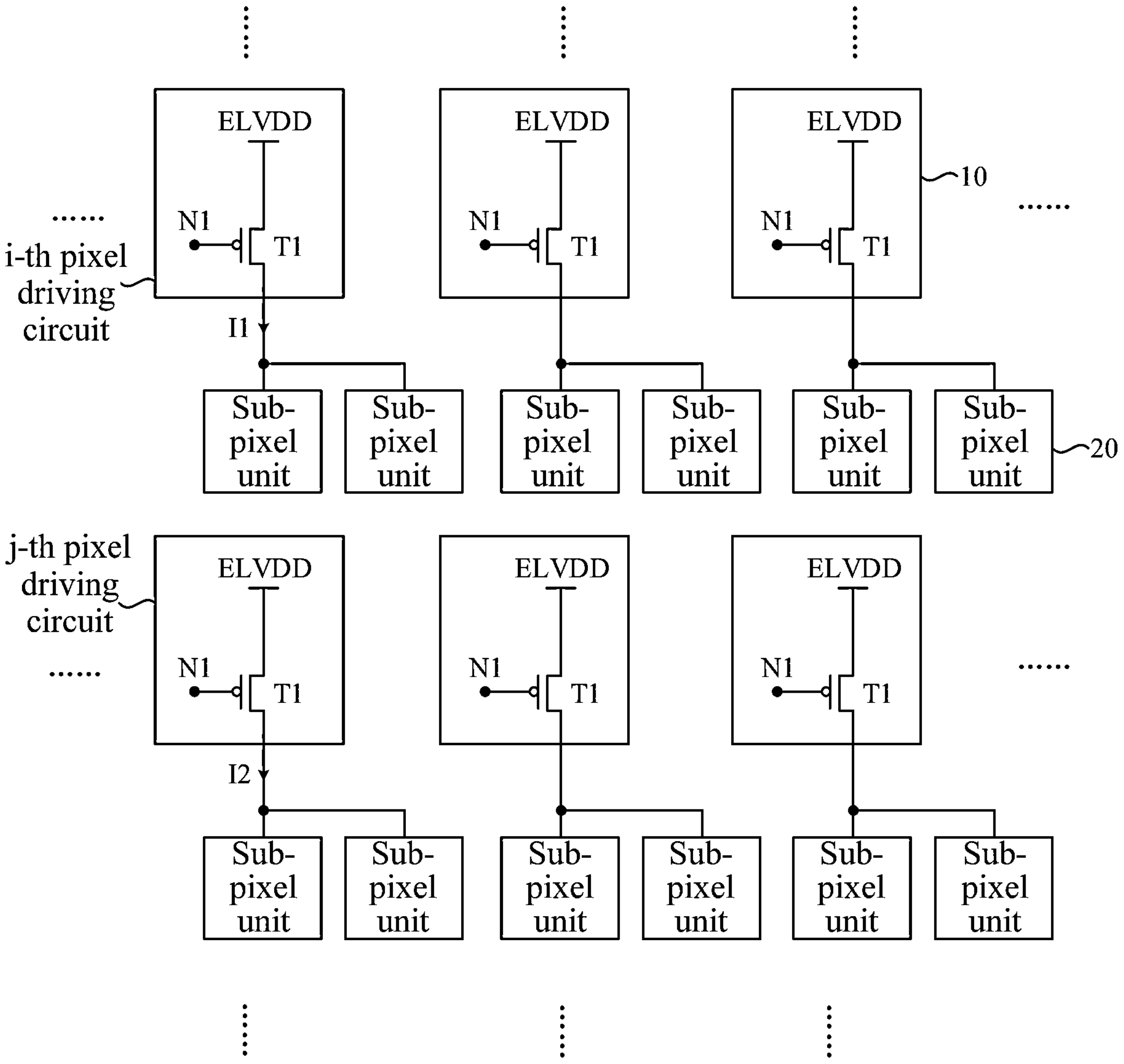
FIG. 9 is a diagram illustrating the partial structure of another display panel according to an embodiment of the present disclosure.

Optionally, FIG. 9 is a diagram illustrating the partial structure of another display panel according to an embodiment of the present disclosure. As shown in FIG. 9, the number of sub-pixel units 20 electrically connected to output terminals of driving transistors T1 of any two pixel driving circuits 10 is the same and greater than one.

Exemplarily, FIG. 9 shows that the output terminal of the driving transistor T1 of each pixel driving circuit 10 is electrically connected to two sub-pixel units 20, but this embodiment is not limited thereto. In this case, the driving current received by each of two sub-pixel units 20 electrically connected to an i-th pixel driving circuit is I1/2. The driving current received by each of two sub-pixel units 20 electrically connected to a j-th pixel driving circuit is I2/2. On the premise that emission colors and luminance of all sub-pixel units 20 are the same, I1/2=I2/2. In this manner, the display uniformity is ensured, and the pixels per inch and display resolution of the display panel can be improved.

Figure 10:
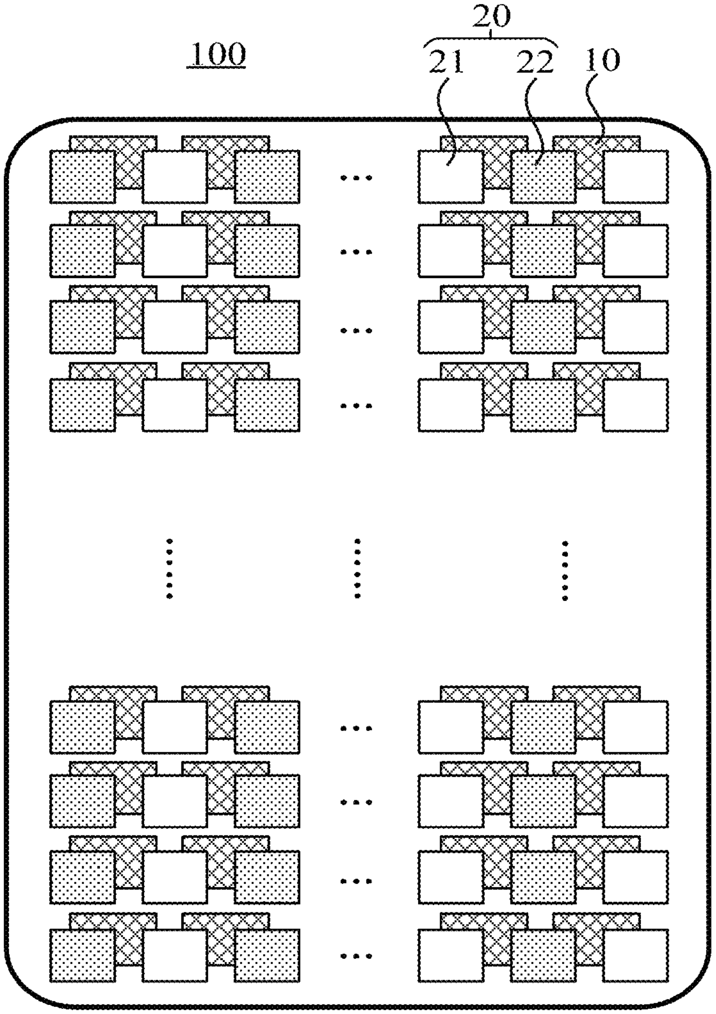
FIG. 10 is a diagram illustrating the structure of another display panel according to an embodiment of the present disclosure.

Optionally, FIG. 10 is a diagram illustrating the structure of another display panel according to an embodiment of the present disclosure. As shown in FIG. 10, N sub-pixel units 20 include N1 first sub-pixel units 21 and N2 second sub-pixel units 22. The emission color of the first sub-pixel units 21 is different from that of the second sub-pixel units 22. N1 and N2 are each a positive integer, and N1+N2≤N. Among M pixel driving circuits 10, M1 pixel driving circuits 10 are configured to drive the N1 first sub-pixel units 21 to emit light. M2 pixel driving circuits 10 are configured to drive the N2 second sub-pixel units 22 to emit light. M1 and M2 are each a positive integer, and M1+M2≤M, where, N1/M1<N2/M2.

The number of first sub-pixel units 21 and the number of second sub-pixel units 22 may be any value. This is not specifically limited in this embodiment of the present disclosure. FIG. 10 is merely an exemplary illustration. In addition, the emission color of first sub-pixel units 21 and the emission color of second sub-pixel units 22 are different. For example, the emission color of first sub-pixel units 21 is blue, and the emission color of second sub-pixel units 22 is green. However, this embodiment is not limited thereto.

In an embodiment, the M pixel driving circuits 10 may be voltage-type pixel driving circuits or current-type pixel driving circuits. This is not specifically limited in this embodiment of the present disclosure and may be provided according to actual requirements. The M1 pixel driving circuits 10 drive the N1 first sub-pixel units 21 to emit light. The M2 pixel driving circuits 10 drive the N2 second sub-pixel units 22 to emit light. On the premise that the display requirements are satisfied, the values of M1, M2, N1, and N2 may be any value. This is also not specifically limited in this embodiment of the present disclosure. Moreover, N1/M1<N2/M2. It is to be understood that the ratio of the number of sub-pixel units 20 to the number of pixel driving circuits 10 may be considered as the driving efficiency of the pixel driving circuits, that is, the number of sub-pixel units 20 driven by each pixel driving circuit 10. The larger the ratio of the number of sub-pixel units 20 to the number of pixel driving circuits 10, the greater the corresponding driving efficiency. As such, N1/M1<N2/M2 can be understood that the driving efficiency of pixel driving circuits 10 for driving first sub-pixel units 21 to emit light is less than the driving efficiency of pixel driving circuits 10 for driving second sub-pixel units 22 to emit light. For example, when the number N1 of first sub-pixel units 21 is the same as the number N2 of second sub-pixel units 22, the number of pixel driving circuits 10 for driving the first sub-pixel units 21 to emit light is greater than the number of pixel driving circuits 10 for driving the second sub-pixel units 22 to emit light, that is, M1>M2.

Thus, on the premise that the display requirements are satisfied, the number of the pixel driving circuits 10 for driving the first sub-pixel units 21 to emit light and the number of the pixel driving circuits 10 for driving the second sub-pixel units 22 to emit light are reasonably allocated to ensure display uniformity.

Optionally, with continued reference to FIG. 10, the sum of the target luminance of a set number of first sub-pixel units 21 is greater than the sum of the target luminance of the set number of sub-pixel units 22. In other words, the average target luminance of the first sub-pixel units 21 is greater than the average target luminance of the second sub-pixel units 22. It is to be understood that, in this display panel 100, the target luminance of the N1 first sub-pixel units 21 has a larger contribution than the target luminance of the N2 second sub-pixel units 22. In this case, the driving efficiency of the pixel driving circuits 10 for driving the first sub-pixel units 21 to emit light can be made less than the driving efficiency of the pixel driving circuits 10 for driving the second sub-pixel units 22 to emit light, that is, N1/M1<N2/M2. For example, when the number N1 of first sub-pixel units 21 is the same as the number N2 of second sub-pixel units 22, the number M1 of pixel driving circuits 10 for driving the first sub-pixel units 21 to emit light can be made greater than the number M2 of pixel driving circuits 10 for driving the second sub-pixel units 22 to emit light. Thus, this can ensure that the N1 first sub-pixel units 21 can be driven by more pixel driving circuits 10 to emit light to satisfy the display requirements of the display panel 100. Without affecting the effect, the number of pixel driving circuits 10 can be reduced, thereby facilitating the improvement of pixels per inch and resolution.

Optionally, with continued reference to FIG. 10, the light-emitting efficiency of the first sub-pixel units 21 is less than the light-emitting efficiency of the second sub-pixel units 22.

It is to be understood that the first sub-pixel units 21 and the second sub-pixel units 22 may be organic light-emitting diodes. Since light-emitting materials of sub-pixel units 20 of different emission colors are different, the light-emitting efficiency of the sub-pixel units 20 of different emission colors is also different. When driving transistors T1 of pixel driving circuits 10 have the same size, the light-emitting efficiency of blue is lower. Therefore, when the same display gray level needs to be presented, the value of a driving signal required by first sub-pixel units 21 having lower light-emitting efficiency is greater than the value of a driving signal required by second sub-pixel units 22 having higher light-emitting efficiency.

Exemplarily, with continuing reference to FIG. 10, the emission color of the first sub-pixel units 21 may be blue. The emission color of the second sub-pixel units 22 may be green. The light-emitting efficiency of the first sub-pixel units 21 is less than the light-emitting efficiency of the second sub-pixel units 22. In this case, the driving efficiency of pixel driving circuits 10 for driving the first sub-pixel units 21 to emit light may be made less than the driving efficiency of pixel driving circuits 10 for driving the second sub-pixel units 22 to emit light, that is, $N1/M1<N2/M2$. For example, when the number N1 of first sub-pixel units 21 is the same as the number N2 of second sub-pixel units 22, the number M1 of pixel driving circuits 10 for driving the first sub-pixel units 21 to emit light may be made greater than the number M2 of pixel driving circuits 10 for driving the second sub-pixel units 22 to emit light. That is, the N1 first sub-pixel units 21 can be driven by more pixel driving circuits 10 to emit light, while the N2 second sub-pixel units 22 can be driven by less pixel driving circuits 10 to emit light. Thus, uniformity of the display panel is ensured, and the display effect is improved.

Optionally, the difference of driving signals corresponding to first sub-pixel units 21 is less than the difference of driving signals corresponding to second sub-pixel units 22 under any two adjacent display gray levels. The driving signals include driving voltages or driving currents.

It is to be understood that when emitting light, each sub-pixel unit 20 corresponds to a display gray level value. The display gray level value can be considered to be the luminance of the sub-pixel unit 20. The higher the display gray level value, the higher the luminance of the sub-pixel unit 20. Moreover, the larger the value of the driving signal required to be supplied to the sub-pixel unit 20 by a pixel driving circuit 10 is. The display gray level may be divided into 256 (0 to 255) gray levels, but this is not limited thereto.

Figure 11:
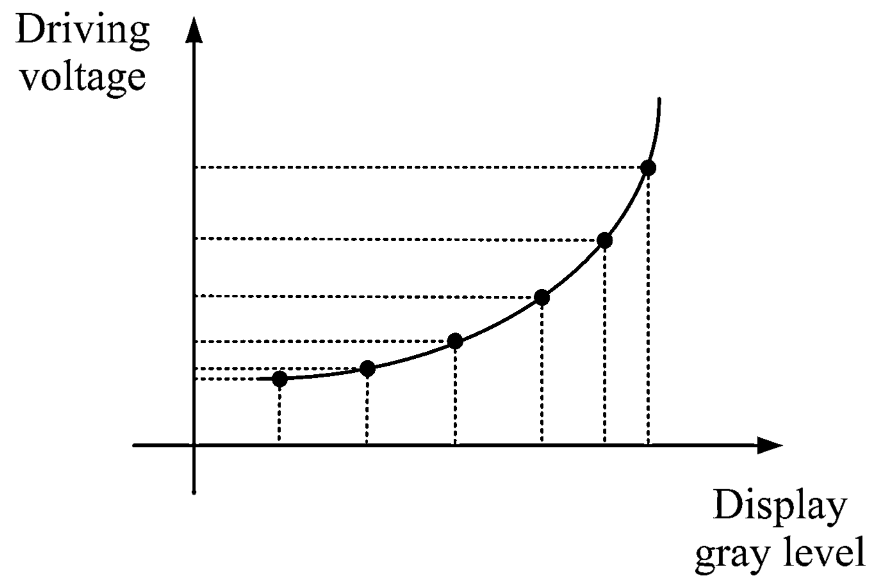
FIG. 11 is a graph showing the relationship between a display gray level of a sub-pixel unit and a driving voltage of the sub-pixel unit according to an embodiment of the present disclosure.
Figure 12:
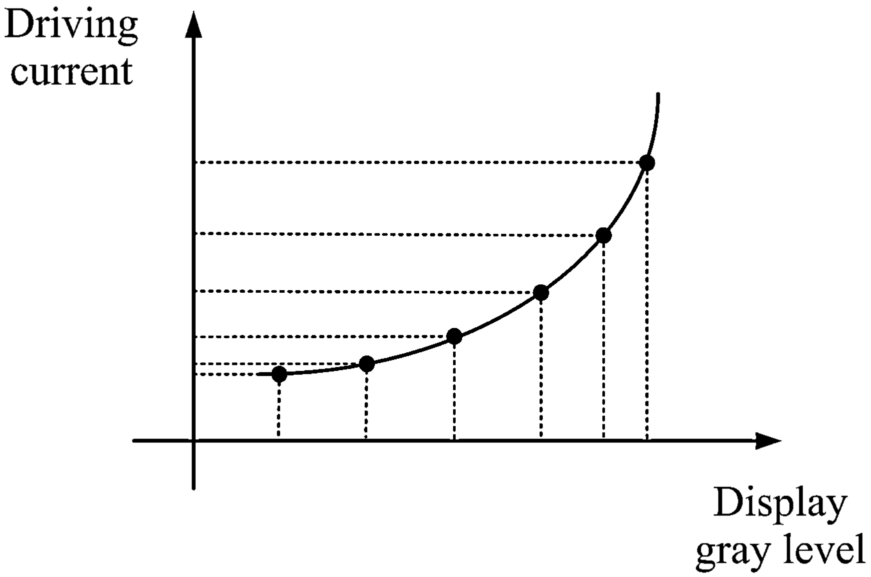
FIG. 12 is a graph showing the relationship between a display gray level of a sub-pixel unit and a driving current of the sub-pixel unit according to an embodiment of the present disclosure.

In an embodiment, FIG. 11 is a graph showing the relationship between a display gray level of a sub-pixel unit and a driving voltage of the sub-pixel unit according to an embodiment of the present disclosure. FIG. 12 is a graph showing the relationship between a display gray level of a sub-pixel unit and a driving current of the sub-pixel unit according to an embodiment of the present disclosure. It can be seen that magnitudes of driving voltages or driving currents corresponding to a sub-pixel unit 20 under different display gray levels are different. The larger the value of the display gray level is, the larger the value of the corresponding driving voltage or driving current is. Generally, when the sub-pixel unit 20 is adjusted to perform light-emitting display at different display gray levels, the display requirements can be satisfied by adjusting the magnitude of the driving signal supplied from a pixel driving circuit 10 to the sub-pixel unit 20. With continued reference to FIG. 11 and FIG. 12, the difference of driving signals corresponding to adjacent display gray levels of the sub-pixel unit 20 is the adjustment accuracy. The smaller the difference of the driving signals corresponding to the adjacent display gray levels, the higher the adjustment accuracy of the display gray levels. Conversely, the larger the difference of the driving signals corresponding to the adjacent display gray levels, the smaller the adjustment accuracy of the display gray levels.

Thus, the difference of driving signals corresponding to the first sub-pixel units 21 is less than the difference of driving signals corresponding to the second sub-pixel units 22 under any two adjacent display gray levels. It can be understood as the adjustment accuracy of the display gray levels of the first sub-pixel units 21 being greater than the adjustment accuracy of the display gray levels of the second sub-pixel units 22. In this case, the driving efficiency of pixel driving circuits 10 for driving the first sub-pixel units 21 to emit light can be made less than the driving efficiency of pixel driving circuits 10 for driving the second sub-pixel units 22 to emit light, that is, $N1/M1<N2/M2$. For example, when the number N1 of first sub-pixel units 21 is the same as the number N2 of second sub-pixel units 22, the number M1 of pixel driving circuits 10 for driving the first sub-pixel units 21 to emit light can be made greater than the number M2 of pixel driving circuits 10 for driving the second sub-pixel units 22 to emit light. That is, the N1 first sub-pixel units 21 can be driven by more pixel driving circuits 10 to emit light, while the N2 second sub-pixel units 22 can be driven by less pixel driving circuits 10 to emit light. Thus, uniformity of the display panel is ensured, and the display effect is improved.

Figure 13:
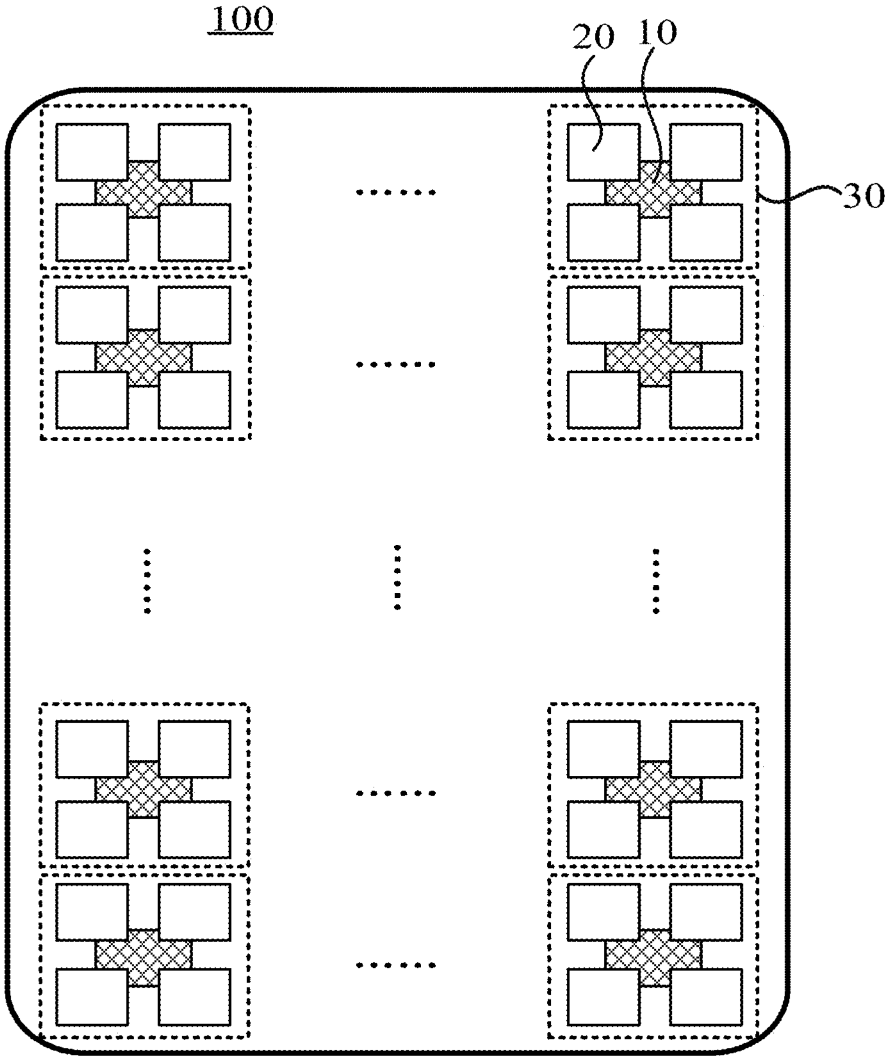
FIG. 13 is a diagram illustrating the structure of another display panel according to an embodiment of the present disclosure.
Figure 14:
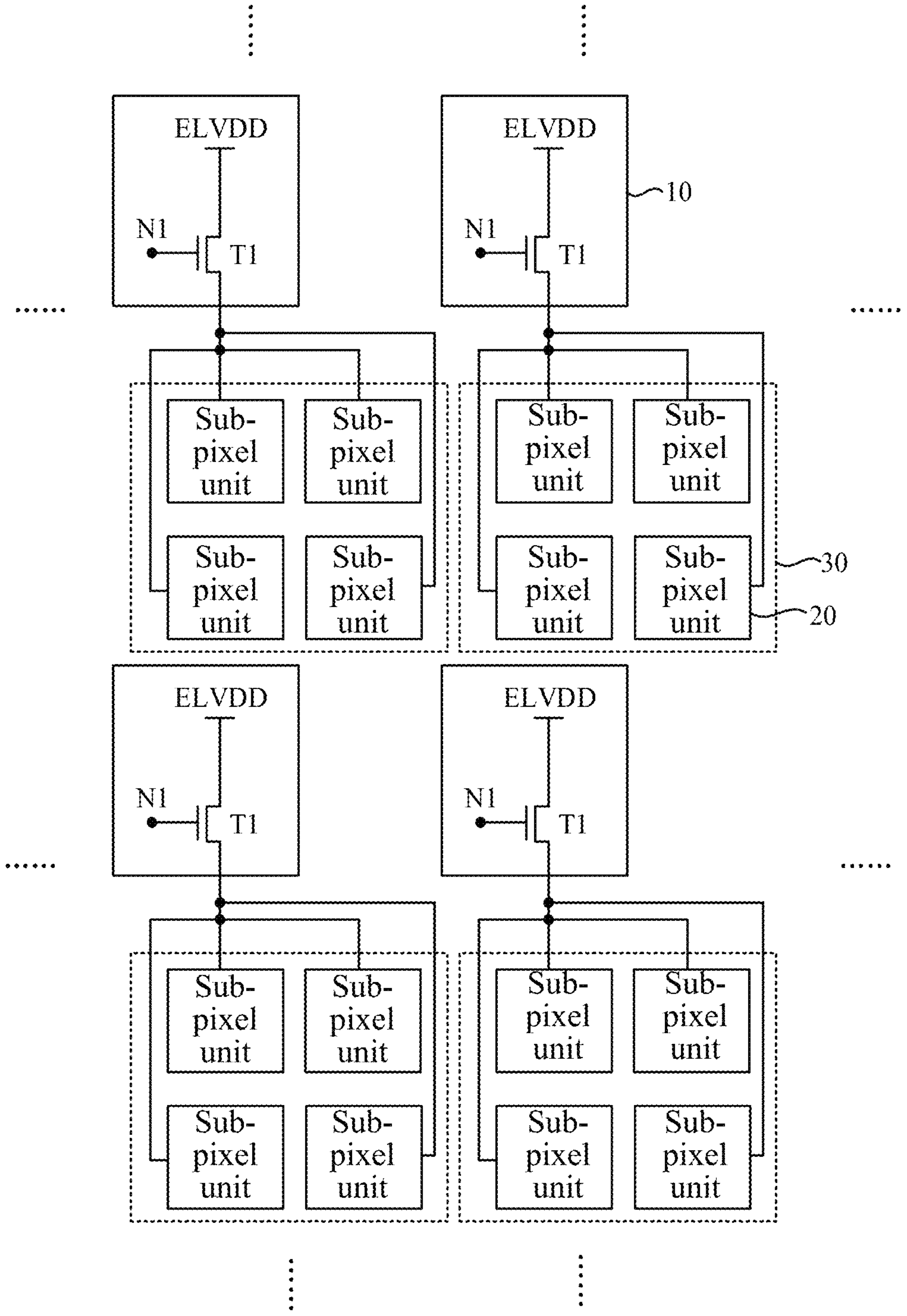
FIG. 14 is a diagram illustrating the partial structure of another display panel according to an embodiment of the present disclosure.

Optionally, FIG. 13 is a diagram illustrating the structure of another display panel according to an embodiment of the present disclosure. FIG. 14 is a diagram illustrating the partial structure of another display panel according to an embodiment of the present disclosure. With reference to FIG. 13 and FIG. 14, a display panel 100 includes multiple pixel unit groups 30. A pixel unit group 30 includes multiple sub-pixel units 20. A pixel driving circuit 10 includes a driving transistor T1. The driving transistor T1 includes an n-channel thin-film transistor. In the same pixel unit group 30, when the difference between the maximum driving voltage of sub-pixel units 20 and the minimum driving voltage of the sub-pixel units 20 is less than or equal to 5 V under any display gray level, the pixel unit group 30 is driven by the same pixel driving circuit 10 to emit light.

It is to be understood that the driving transistor T1 of a pixel driving circuit 10 includes an n-channel thin-film transistor. That is, the pixel driving circuit 10 is a voltage-type pixel driving circuit and can supply a driving voltage to a sub-pixel unit 20 to drive the sub-pixel unit 20 to emit light.

Figure 15:
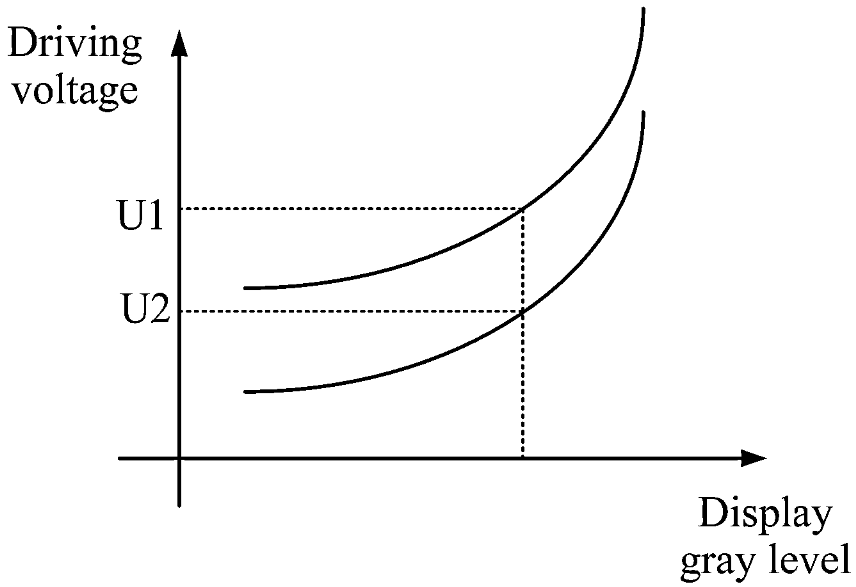
FIG. 15 is a graph showing the relationships between display gray levels and driving voltages of two sub-pixel units in the same pixel unit group according to an embodiment of the present disclosure.

In an embodiment, the number of sub-pixel units 20 in the same pixel unit group 30 may be any value. This is not specifically limited in this embodiment of the present disclosure and may be provided according to actual requirements. FIG. 15 is a graph showing the relationships between display gray levels and driving voltages of two sub-pixel units in the same pixel unit group according to an embodiment of the present disclosure. With reference to FIG. 14 and FIG. 15, in the same pixel unit group 30, the difference between the maximum driving voltage of sub-pixel units 20 and the minimum driving voltage of the sub-pixel units 20 is less than or equal to 5 V, that is, $U1-U2\leq 5V$, under any display gray level. It is to be understood that the difference between values of driving voltages of all sub-pixel units 20 in the pixel unit group 30 is small. Thus, the difference in the luminance of all sub-pixel units 20 is small. In this case, the pixel unit group 30 can be driven by the same pixel driving circuit 10 to emit light. When the display requirements are satisfied, the number of pixel driving circuits 10 can be reduced, thereby facilitating the improvement of pixels per inch of a display panel. Moreover, the number of pixel driving circuits 10 does not need to be increased when sub-pixel units 20 are added to derivative products, thereby reducing the cost.

Figure 16:
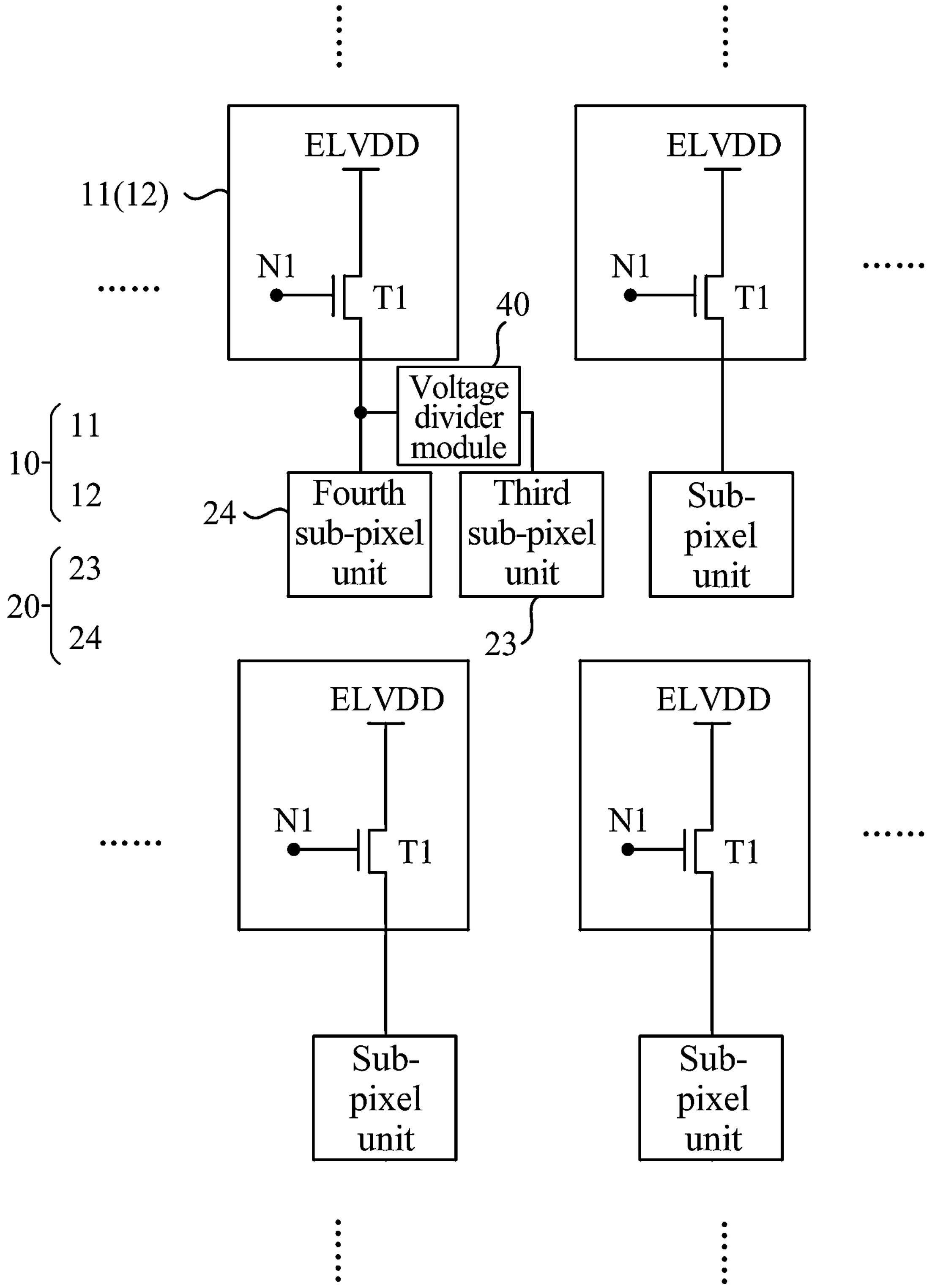
FIG. 16 is a diagram illustrating the partial structure of another display panel according to an embodiment of the present disclosure.

Optionally, FIG. 16 is a diagram illustrating the partial structure of another display panel according to an embodiment of the present disclosure. As shown in FIG. 16, two adjacent sub-pixel units 20 are a third sub-pixel unit 23 and a fourth sub-pixel unit 24, respectively. A pixel driving circuit 10 includes a first pixel driving circuit 11 and a second pixel driving circuit 12. The output terminal of the first pixel driving circuit 11 is electrically connected to the third sub-pixel unit 23 through a voltage divider module 40. The output terminal of the second pixel driving circuit 12 is electrically connected to the fourth sub-pixel unit 24. When the voltage difference across the voltage divider module 40 is less than or equal to 5 V, the first pixel driving circuit 11 is reused as the second pixel driving circuit 12.

The pixel driving circuit 10 includes a driving transistor T1. The driving transistor T1 includes an n-channel thin-film transistor. That is, the pixel driving circuit 10 is a voltage-type pixel driving circuit and can supply a driving voltage to a sub-pixel unit 20 to drive the sub-pixel unit 20 to emit light.

In an embodiment, the voltage divider module 40 may be a switch transistor, a resistor, a diode, or the like. This is not specifically limited in this embodiment of the present disclosure. FIG. 16 merely illustrates a diagram illustrating the partial structure of a display panel 100, but this is not limited thereto. When the driving voltage supplied by the first pixel driving circuit 11 is the same as the driving voltage supplied by the second pixel driving circuit 12 under any display gray level, the difference between the driving voltage required by the third sub-pixel unit 23 and the driving voltage required by the fourth sub-pixel unit 24 is the voltage drop of the voltage divider module 40, that is, the voltage difference across the voltage divider module 40. When the difference is less than or equal to 5 V, the difference between the value of the driving voltage received by the third sub-pixel unit 23 and the value of the driving voltage received by the fourth sub-pixel unit 24 is small so that the difference in the luminance is small. At this time, the first pixel driving circuit 11 can be reused as the second pixel driving circuit 12 to reduce the number of pixel driving circuits 10, thereby facilitating the increase of pixels per inch of the display panel. Moreover, the number of pixel driving circuits 10 does not need to be increased when sub-pixel units 20 are added to derivative products, thereby reducing the cost.

Figure 17:
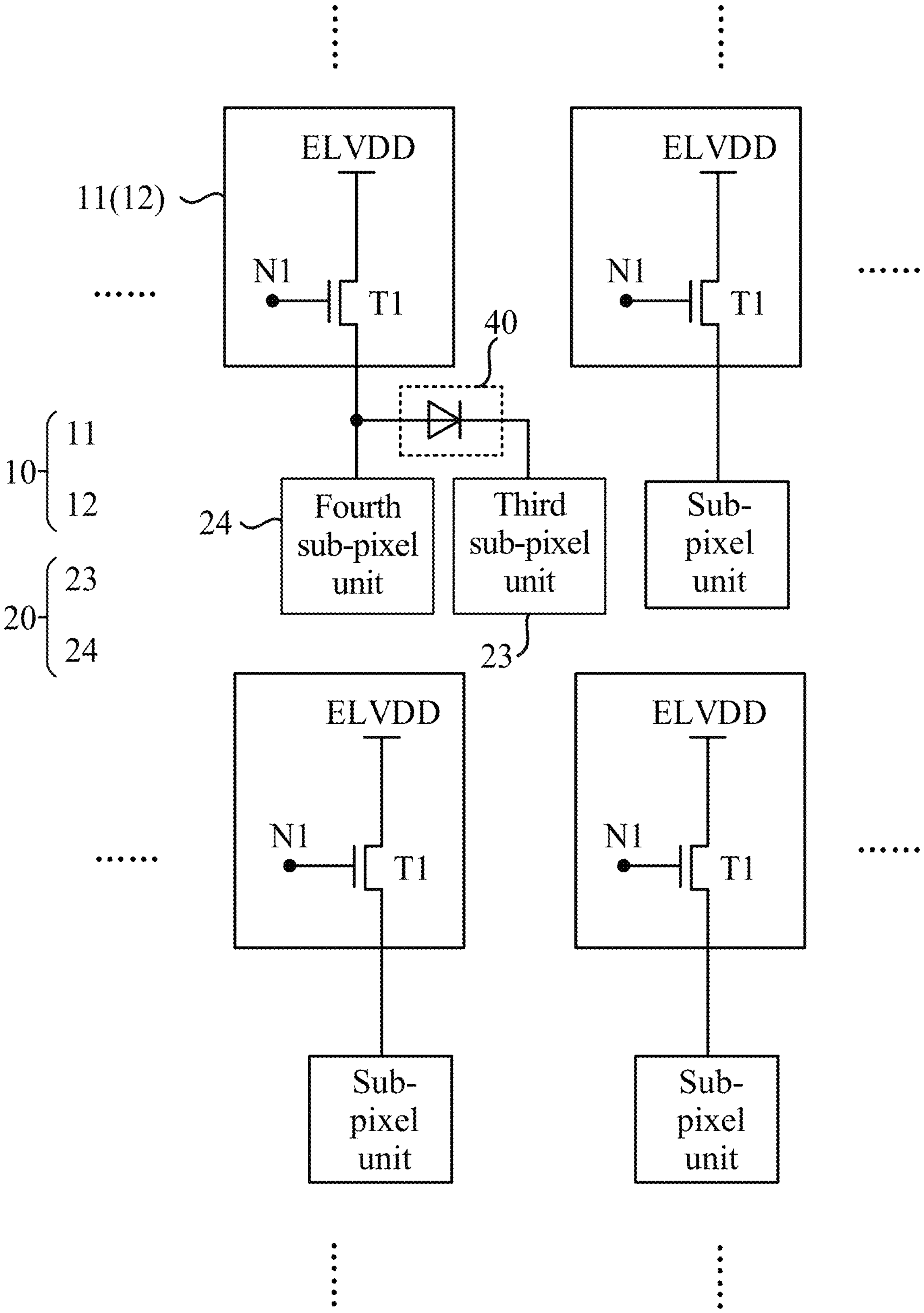
FIG. 17 is a diagram illustrating the partial structure of another display panel according to an embodiment of the present disclosure.
Figure 18:
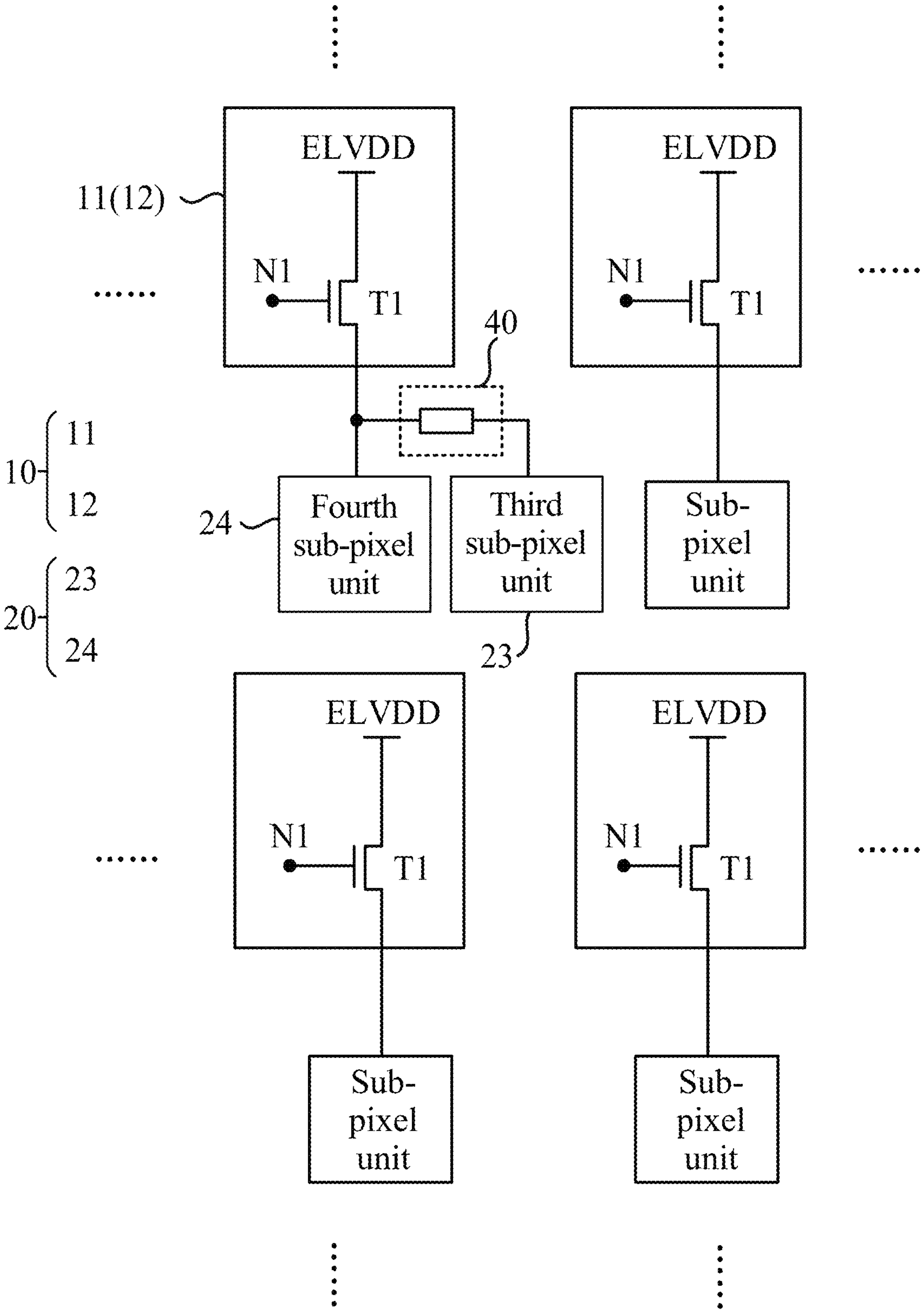
FIG. 18 is a diagram illustrating the partial structure of another display panel according to an embodiment of the present disclosure.

In an optional embodiment, the voltage divider module 40 includes a diode or an adjustable resistor. Referring to FIG. 17, the anode of a diode is electrically connected to the second terminal of a driving transistor T1, and the cathode of the diode is electrically connected to a third sub-pixel unit 23. The diode may be an ideal diode or a diode with a very small on resistance. This is not specifically limited in this embodiment of the present disclosure. With reference to FIG. 18, the voltage divider module 40 may also be an adjustable resistor. The resistor value may be set according to actual requirements. This is not specifically limited in this embodiment of the present disclosure. Thus, the driving voltage received by the third sub-pixel unit 23 can be adjusted to adjust the luminance of the third sub-pixel unit 23 to satisfy different display requirements.

Figure 19:
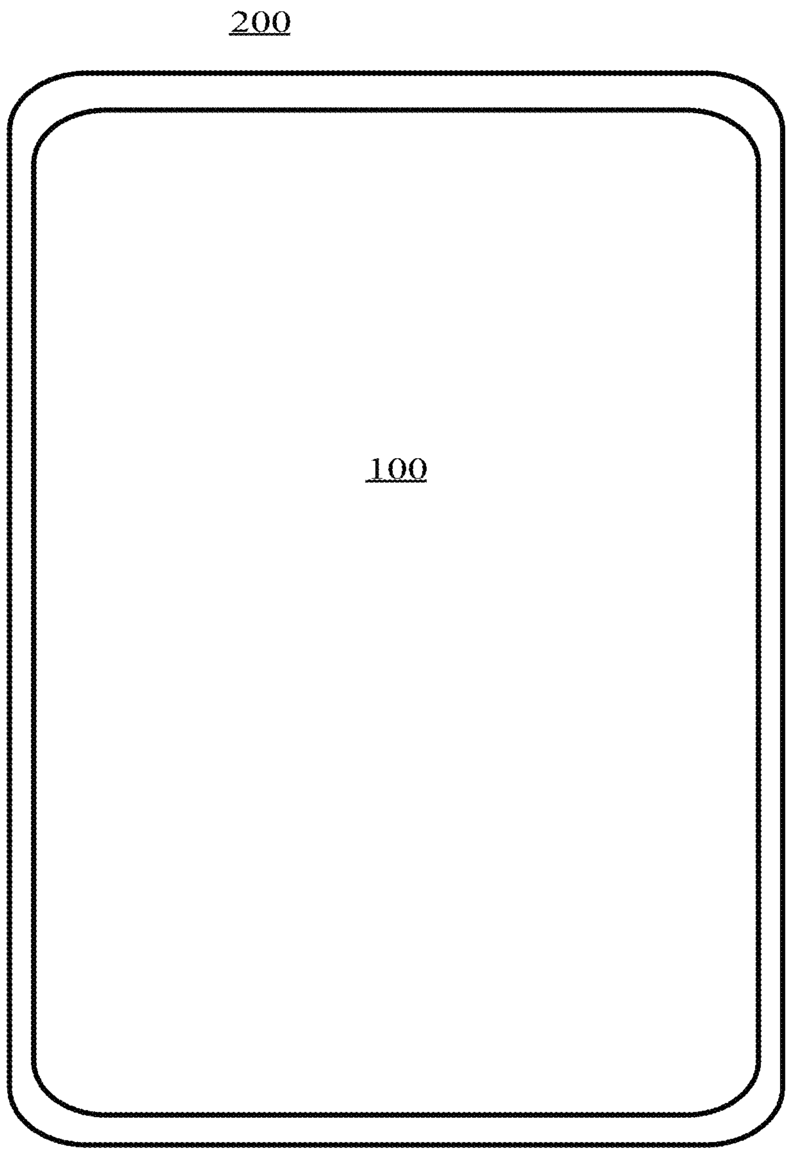
FIG. 19 is a diagram illustrating the structure of a display apparatus according to an embodiment of the present disclosure.

Based on the same inventive concept, an embodiment of the present disclosure also provides a display apparatus. FIG. 19 is a diagram illustrating the structure of a display apparatus according to an embodiment of the present disclosure. As shown in FIG. 19, the display apparatus 200 provided in this embodiment of the present disclosure includes all technical features of the display panel 100 provided in the embodiments of the present disclosure and can achieve the beneficial effects of the display panel 100 provided by the embodiments of the present disclosure. For the same, reference may be made to the description of the display panel 100 provided in the embodiments of the present disclosure. The details are not repeated here. The display apparatus 200 provided in this embodiment of the present disclosure may be a near-eye display apparatus or any electronic product with a display function including but not limited to a virtual reality (VR) product, an augmented reality (AR) product, a television, a notebook computer, a desktop display, a tablet computer, a digital camera, a smart bracelet, a pair of smart glasses, an in-vehicle display, medical equipment, industrial control equipment, a touch interactive terminal. This embodiment of the present disclosure is not particularly limited thereto.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display panel comprising M pixel driving circuits and N sub-pixel units, wherein $M<N$, and M and N are each a positive integer; and the M pixel driving circuits are configured to drive the N sub-pixel units to emit light;

wherein one of the following is satisfied:

the N sub-pixel units have a same emission color, each of the M pixel driving circuits comprises a driving transistor, the driving transistor comprises an n-channel thin-film transistor, and two of the M pixel driving circuits are configured to drive different numbers of sub-pixel units among the N sub-pixel units, wherein among the M pixel driving circuits, an output terminal of a driving transistor of one pixel driving circuit is electrically connected to $N-M+1$ sub-pixel units of the N sub-pixel units, and an output terminal of a driving transistor of each of other pixel driving circuits is electrically connected to one of the N sub-pixel units;

emission colors of the N sub-pixel units are same, each of the M pixel driving circuits comprises a driving transistor, the driving transistor comprises a p-channel thin-film transistor, and the M pixel driving circuits comprise an i-th pixel driving circuit and an j-th pixel driving circuit, wherein $1\leq i\leq M$, $1\leq j\leq M$, and $i\neq j$, wherein a difference $\Delta I$ between a driving current I1 output from the i-th pixel driving circuit and a driving current I2 output from the j-th pixel driving circuit satisfies $\Delta I/((I1+I2)/2)\leq 20\%$; or the N sub-pixel units comprise N1 first sub-pixel units and N2 second sub-pixel units, and an emission color of the first sub-pixel units is different from an emission color of the second sub-pixel units, wherein N1 and N2 are each a positive integer and $N1+N2\leq N$, and among the M pixel driving circuits, M1 pixel driving circuits are configured to drive the N1 first sub-pixel units to emit light, M2 pixel driving circuits are configured to drive the N2 second sub-pixel units to emit light, wherein M1 and M2 are each a positive integer, and $M1+M2\leq M$, wherein $N1/M1<N2/M2$.

2. The display panel according to claim 1, wherein output terminals of driving transistors of any two of the M pixel driving circuits are electrically connected to a same number of sub-pixel units, and the number is greater than one.

3. The display panel according to claim 1, wherein a sum of target luminance of a set number of first sub-pixel units of the N1 first sub-pixel units is greater than a sum of target luminance of the set number of second sub-pixel units of the N2 second sub-pixel units.

4. The display panel according to claim 1, wherein light-emitting efficiency of each of the N1 first sub-pixel units is less than light-emitting efficiency of each of the N2 second sub-pixel units.

5. The display panel according to claim 1, wherein, under any two adjacent display gray levels, a difference of driving signals corresponding to the first sub-pixel units is less than a difference of driving signals corresponding to the second sub-pixel units, wherein the driving signals comprise driving voltages or driving currents.

6. The display panel according to claim 1, comprising a plurality of pixel unit groups, wherein each of the plurality of pixel unit groups comprises a plurality of sub-pixel units of the N sub-pixel units;

in a case where each of the M pixel driving circuits comprises the driving transistor, and the driving transistor comprises the n-channel thin-film transistor; and in a same pixel unit group of the plurality of pixel unit groups, when a difference between a maximum driving voltage of the plurality of sub-pixel units and a minimum driving voltage of the plurality of sub-pixel units is less than or equal to 5 V under any display gray level, the pixel unit group is driven to emit light by a same pixel driving circuit of the M pixel driving circuits.

7. The display panel according to claim 6, wherein two adjacent sub-pixel units of the plurality of sub-pixel units are a third sub-pixel unit and a fourth sub-pixel unit, respectively;

the pixel driving circuit comprises a first pixel driving circuit and a second pixel driving circuit, wherein an output terminal of the first pixel driving circuit is electrically connected to the third sub-pixel unit through a voltage divider module, and an output terminal of the second pixel driving circuit is electrically connected to the fourth sub-pixel unit; and when a voltage difference across the voltage divider module is less than or equal to 5 V, the first pixel driving circuit is reused as the second pixel driving circuit.

8. The display panel according to claim 7, wherein the voltage divider module comprises a diode or an adjustable resistor.

9. The display panel according to claim 1, wherein each of the M pixel driving circuits comprises a driving transistor, a data writing module, a light emitting control module, and a storage module, wherein the data writing module is electrically connected to a gate of the driving transistor to write a data signal to the driving transistor;

the light emitting control module is configured to control the driving transistor to supply a driving signal to at least one sub-pixel unit of the N sub-pixel units; and the storage module is configured to store the data signal written to the gate of the driving transistor.

10. The display panel according to claim 9, wherein the data writing module comprises a first writing transistor and a second writing transistor, wherein a channel type of the first writing transistor is different from a channel type of the second writing transistor; and a first terminal of the first writing transistor and a first terminal of the second writing transistor are electrically connected to a data signal terminal, a second terminal of the first writing transistor and a second terminal of the second writing transistor are electrically connected to the gate of the driving transistor, a gate of the first writing transistor is electrically connected to a first scan signal terminal, and a gate of the second writing transistor is electrically connected to a second scan signal terminal;

the light emitting control module comprises a light emitting control transistor, wherein a first terminal of the light emitting control transistor is electrically connected to a second terminal of the driving transistor, a second terminal of the light emitting control transistor is electrically connected to the at least one sub-pixel unit of the N sub-pixel units, and a gate of the light emitting control transistor is electrically connected to a light emitting control signal terminal; and the storage module comprises a storage capacitor, wherein a first plate of the storage capacitor is electrically connected to a first power supply terminal, and a second plate of the storage capacitor is electrically connected to the gate of the driving transistor.

11. A display apparatus, comprising a display panel, wherein the display panel comprises M pixel driving circuits and N sub-pixel units, wherein $M<N$, and M and N are each a positive integer; and the M pixel driving circuits are configured to drive the N sub-pixel units to emit light;

wherein one of the following is satisfied:

the N sub-pixel units have a same emission color, each of the M pixel driving circuits comprises a driving transistor, the driving transistor comprises an n-channel thin-film transistor, and two of the M pixel driving circuits are configured to drive different numbers of sub-pixel units among the N sub-pixel units, wherein among the M pixel driving circuits, an output terminal of a driving transistor of one pixel driving circuit is electrically connected to $N-M+1$ sub-pixel units of the N sub-pixel units, and an output terminal of a driving transistor of each of other pixel driving circuits is electrically connected to one of the N sub-pixel units;

emission colors of the N sub-pixel units are same, each of the M pixel driving circuits comprises a driving transistor, the driving transistor comprises a p-channel thin-film transistor, and the M pixel driving circuits comprise an i-th pixel driving circuit and an j-th pixel driving circuit, wherein $1\leq i\leq M$, $1\leq j\leq M$, and $i\neq j$, wherein a difference $\Delta I$ between a driving current I1 output from the i-th pixel driving circuit and a driving current I2 output from the j-th pixel driving circuit satisfies $\Delta I/((I1+I2)/2) \leq 20\%$; or the N sub-pixel units comprise N1 first sub-pixel units and N2 second sub-pixel units, and an emission color of the first sub-pixel units is different from an emission color of the second sub-pixel units, wherein N1 and N2 are each a positive integer and $N1+N2 \leq N$, and among the M pixel driving circuits, M1 pixel driving circuits are configured to drive the N1 first sub-pixel units to emit light, M2 pixel driving circuits are configured to drive the N2 second sub-pixel units to emit light, wherein M1 and M2 are each a positive integer, and $M1+M2 \leq M$, wherein $N1/M1 < N2/M2$.

* * * * *